(12) United States Patent
Park et al.

(10) Patent No.: US 10,921,646 B2
(45) Date of Patent: Feb. 16, 2021

(54) DISPLAY DEVICE AND METHOD FOR MANUFACTURING THE SAME

(71) Applicant: SAMSUNG DISPLAY CO., LTD., Yongin-si (KR)

(72) Inventors: Junwoo Park, Hwaseong-si (KR); Oseung Yang, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/591,370

(22) Filed: Oct. 2, 2019

(65) Prior Publication Data

US 2020/0110312 A1    Apr. 9, 2020

(30) Foreign Application Priority Data

Oct. 4, 2018  (KR) .......................... 10-2018-0117971

(51) Int. Cl.
*G02F 1/13357*  (2006.01)

(52) U.S. Cl.
CPC .. *G02F 1/133608* (2013.01); *G02F 1/133603* (2013.01); *G02F 1/133605* (2013.01); *G02F 1/133617* (2013.01); *G02F 2001/133612* (2013.01)

(58) Field of Classification Search
CPC ..................... G02F 1/133603; G02F 1/133608
See application file for complete search history.

(56) References Cited

U.S. PATENT DOCUMENTS

| 9,551,899 B2 | 1/2017 | Kim et al. |
| 10,082,698 B2 | 9/2018 | Kang et al. |
| 2008/0117356 A1* | 5/2008 | Oku .................. G02F 1/133609 349/62 |
| 2017/0126650 A1 | 5/2017 | Pickett et al. |

FOREIGN PATENT DOCUMENTS

| JP | 2016181474 | 10/2016 |
| KR | 10-2012-0045968 | 5/2012 |
| KR | 10-2012-0078883 | 7/2012 |
| KR | 10-2016-0117404 | 10/2016 |
| KR | 10-2017-0085174 | 7/2017 |

* cited by examiner

*Primary Examiner* — Sean P Gramling
(74) *Attorney, Agent, or Firm* — F. Chau & Associates, LLC

(57) ABSTRACT

A display device includes a base substrate, a display panel disposed on a first surface of the base substrate, a low-refractive index layer disposed between the first surface and the display panel, a plurality of light source units disposed under a second surface opposite to the first surface of the base substrate, and a plurality of housings that define accommodation recesses and which respectively accommodate the light source units in the accommodation recesses. The light source units are exposed to the base substrate through the accommodation grooves, and the housings are connected to the second surface.

19 Claims, 18 Drawing Sheets

DISPLAY DEVICE AND METHOD FOR MANUFACTURING THE SAME

CROSS-REFERENCE TO RELATED APPLICATIONS

This U.S. non-provisional patent application claims priority under 35 U.S.C. § 119 from, and the benefit of, Korean Patent Application No. 10-2018-0117971, filed on Oct. 4, 2018 in the Korean Intellectual Property Office, the contents of which are herein incorporated by reference in their entirety.

BACKGROUND

Technical Field

Embodiments of present disclosure herein are directed to a display device and a method for manufacturing the same, and more particularly, to a display device with reduced thickness and a method for manufacturing the same.

Discussion of the Related Art

In general, a display device includes a display panel that includes a plurality of pixels and a backlight unit that provides light to the display panel. The backlight unit includes a plurality of light source units that generate light, and the pixels receive the light from the light source units to display an image using the light.

The backlight unit may be an edge type backlight unit or a direct type backlight unit. When a direct type backlight unit is used, the display panel can have luminance greater than that of the edge type backlight unit.

Recently, quantum dot sheets are being used to improve color purity. A quantum dot sheet is disposed on a base substrate and under the display panel. However, when a directly type backlight unit is used, a plurality of light source units are disposed under the base substrate to be spaced apart from the base substrate on which a quantum dot sheet is disposed. A separate single accommodation member for disposing the light source units is disposed spaced apart from the base substrate. Thus, the display device's thickness is increased.

SUMMARY

Embodiments of the present disclosure can provide a display device with reduced thickness and a method for manufacturing the same.

An embodiment of the inventive concept provides a display device, including: a base substrate; a display panel disposed on a first surface of the base substrate; a low-refractive index layer disposed between the first surface and the display panel; a plurality of light source units disposed under a second surface opposite to the first surface of the base substrate; and a plurality of housings that define accommodation recesses that respectively accommodate the light source units therein, wherein the light source units are exposed to the base substrate through the accommodation recesses, and the housings are connected to the second surface.

In an embodiment of the inventive concept, a method for manufacturing a display device includes: disposing a metal layer on a second surface of a base substrate opposite to a first surface of the base substrate; patterning the metal layer to form a reflection layer that includes a plurality of holes and a plurality of openings that extend in a first direction and to form first and second lines in the openings; disposing an insulation layer on the second surface that covers the reflection layer and the first and second lines; disposing a low-refractive index layer on the first surface; disposing a light conversion layer on the low-refractive index layer; disposing a plurality of housings that accommodate a plurality of light source units on the insulation layer; connecting the housings to the lines through contact holes formed in the insulation layer, and disposing a display panel on the light conversion layer, wherein the housings arranged in an h-th row are disposed between an h-th opening and an (h+1)-th opening, wherein h is a natural number.

In an embodiment of the inventive concept, a display device includes a base substrate; a display panel disposed on a first surface of the base substrate; a light conversion layer disposed between the first surface and the display panel; a plurality of light source units disposed under a second surface opposite to the first surface of the base substrate; and a plurality of housings that define accommodation recesses and which respectively accommodate the light source units in the accommodation recesses. The light source units are exposed to the base substrate through the accommodation recesses, and the housings are connected to the second surface.

DETAILED DESCRIPTION

Figure 1:
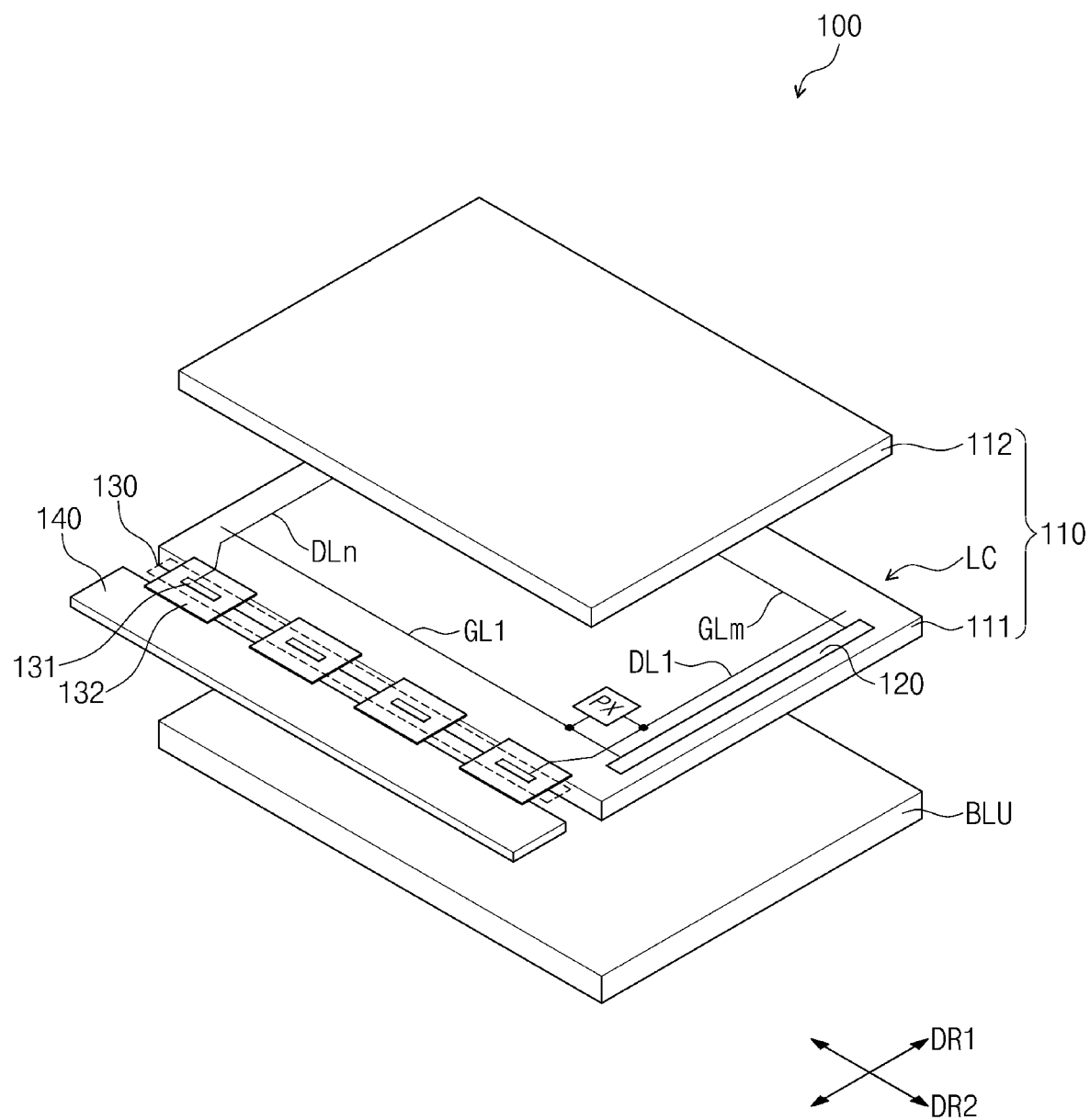
FIG. 1 is a perspective view of a display device according to an embodiment of the inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals may refer to like elements throughout. Also, in the figures, the thickness, ratio, and dimensions of components may be exaggerated for clarity of illustration.

Hereinafter, embodiments of the inventive concept will be described in detail with reference to the accompanying drawings.

FIG. 1 is a perspective view of a display device according to an embodiment of the inventive concept.

Referring to FIG. 1, a display device 100 according to an embodiment of the inventive concept includes a display panel 110, a gate driving unit 120, a data driving unit 130, a printed circuit board 140, and a backlight unit BLU.

According to an embodiment, each of the display panel 110 and the backlight unit BLU has a rectangular shape having short sides in a first direction DR1 and long sides in a second direction DR2 that crosses the first direction DR1. However, the shape of each of the display panel 110 and the backlight unit BLU is not limited thereto, and may differ in other embodiments.

According to an embodiment, the backlight unit BLU generates light and provides the generated light to the display panel 110. The backlight unit BLU is a direct type backlight unit. The display panel 110 generates an image using the light received from the backlight unit BLU. The generated image is displayed to a user through an upper portion of the display panel 110.

According to an embodiment, the display panel 110 includes a first substrate 11l, a second substrate 112 that faces the first substrate 111, and a liquid crystal layer LC disposed between the first substrate 111 and the second substrate 112. Each of the first substrate 111 and the second substrate 112 has a rectangular shape having short sides in the first direction DR1 and long sides in the second direction DR2.

According to an embodiment, a plurality of pixels PX, a plurality of gate lines GL1 to GLm, and a plurality of data lines DL1 to DLn are disposed on the first substrate 111. Here, m and n are natural numbers. For convenience of description, although only one pixel PX is illustrated in FIG. 1, a plurality of pixels PX are disposed on the first substrate 111.

According to an embodiment, the gate lines GL1 to GLm and the data lines DL1 to DLn are insulated from each other and cross each other. The gate lines GL1 to GLm extend in the second direction DR2 and are connected to the gate driving unit 120. The data lines DL1 to DLn extend in the first direction DR1 and are connected to the data driving unit 130. The pixels PX are connected to the gate lines GL1 to GLm and the data lines DL1 to DLn.

According to an embodiment, the gate driving unit 120 is disposed on a predetermined portion of the first substrate 111 adjacent to one of the short sides of the first substrate 111. The gate driving unit 120 is formed in a same process as transistors of the pixels PX and then mounted on the first substrate 111 in the form of an amorphous silicon TFT gate driver circuit (ASG) or oxide semiconductor TFT gate driver circuit (OSG).

However, embodiments of the inventive concept are not limited thereto. For example, the gate driving unit 120 may be provided as a plurality of driving chips and mounted on flexible circuit boards and then be connected to the first substrate 111 as a tape carrier package (TCP). Alternatively, the driving chips of the gate driving unit 120 may be mounted on the first substrate 111 as a chip on glass (COG).

According to an embodiment, the data driving unit 130 includes source driving chips 131 mounted on a flexible circuit board 132. For example, although four source driving chips 131 and four flexible circuit boards 132 are illustrated in FIG. 1, embodiments are not limited thereto, the number of source driving chips 131 and the number of flexible circuit boards 132 may vary according to a size of the display panel 110 in other embodiments.

According to an embodiment, one side of each of the flexible circuit boards 132 is connected to one side of the first substrate 111. The one side of the first substrate 111 is one of the long sides of the first substrate 111. The other side of each of the flexible circuit boards 132, which opposite to the one side of each of the flexible circuit boards 132, is connected to the printed circuit board 140. The source driving chips 131 are connected to the first substrate 111 and the printed circuit board 140 through the flexible circuit boards 132.

According to an embodiment, a timing controller is disposed on the printed circuit board 140. The timing controller is mounted on the printed circuit board 140 as an integrated circuit chip. The timing controller is connected to the gate driving unit 120 and the data driving units 130 through the flexible circuit boards 132. The timing controller outputs a gate control signal, a data control signal, and image data.

According to an embodiment, the gate driving unit 120 receives the gate control signal from the timing controller and generates a plurality of gate signals in response to the gate control signal. The gate driving unit 120 sequentially outputs the gate signals. The gate signals are provided to the pixels PX row-by-row through the gate lines GL1 to GLm. As a result, the pixels PX are driven row-by-row.

According to an embodiment, the data driving unit 130 receives the image data and the data control signal from the timing controller. The data driving unit 130 generates and output analog data voltages that correspond to the image data in response to the data control signal. The data voltages are transmitted to the pixels PX through the data lines DL1 to DLn.

According to an embodiment, the pixels PX receive the data voltages through the data lines DL1 to DLn in response to the gate signals received through the gate lines GL1 to GLm. The pixels PX display gray scales that correspond to the data voltages. As a result, an image can be displayed.

Figure 2:
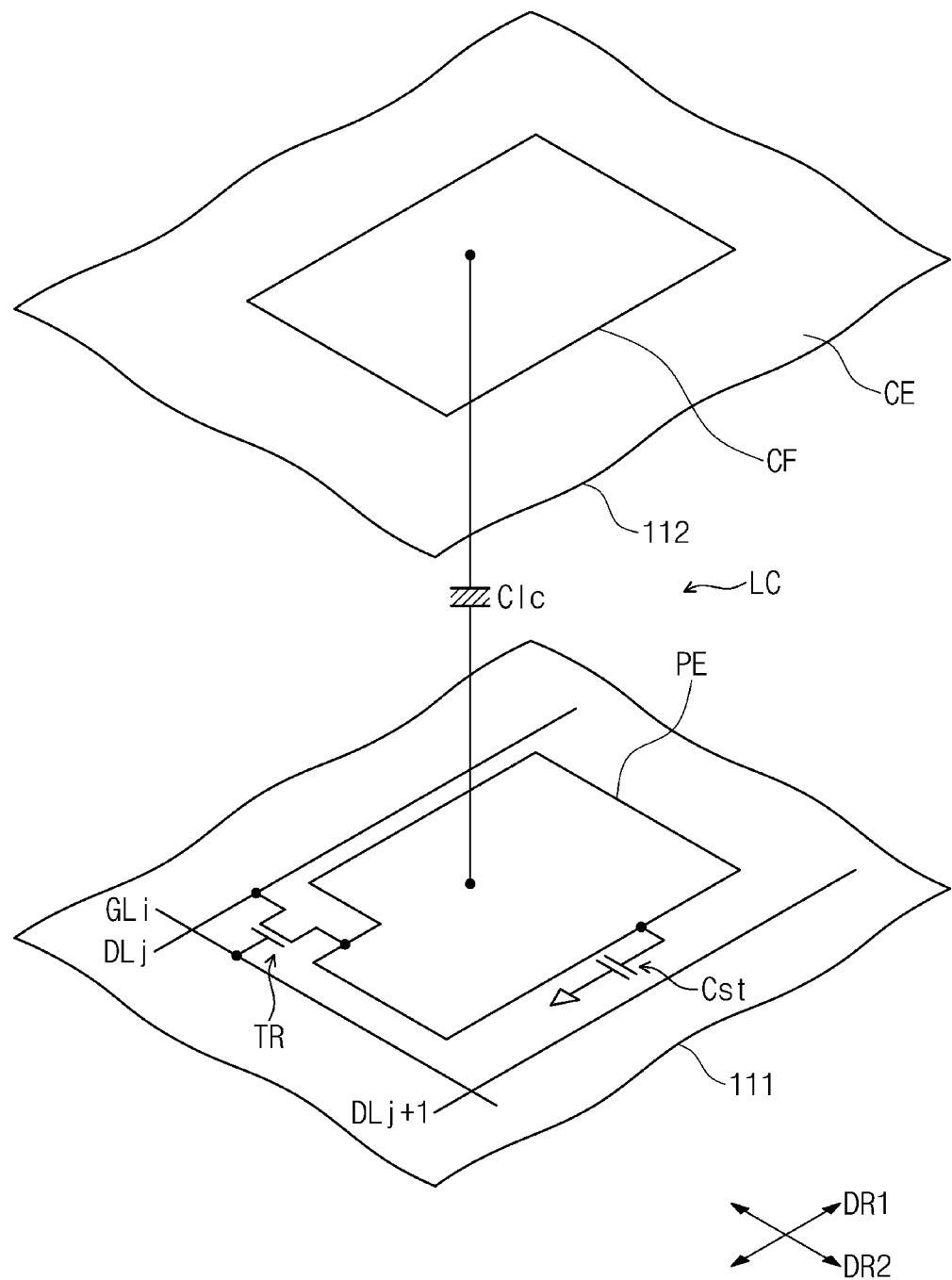
FIG. 2 illustrates a pixel of FIG. 1.

FIG. 2 illustrates a pixel of FIG. 1.

For convenience of description, although the pixel PX illustrated in FIG. 2 is connected to a gate line GLi and a data line DLj, other pixels PX of the display panel 110 are substantially the same the pixels PX of FIG. 2.

Referring to FIG. 2, according to an embodiment, the pixel PX includes a transistor TR connected to the gate line GLi and the data line DLj, a liquid crystal capacitor Clc connected to the transistor TR, and a storage capacitor Cst parallel connected to the liquid crystal capacitor Clc. The storage capacitor Cst may be omitted. Here, i and j are natural numbers.

According to an embodiment, the transistor TR is disposed on the first substrate 111. The transistor TR includes a gate electrode connected to the gate line GLi, a source electrode connected to the data line DLj, and a drain electrode connected to the liquid crystal capacitor Clc and the storage capacitor Cst.

According to an embodiment, the liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer LC can serve as a dielectric. The pixel electrode PE is connected to the drain electrode of the transistor TR.

According to an embodiment, although FIG. 2 illustrates the pixel electrode PE as having a non-slit structure, embodiments of the inventive concept are not limited thereto. For example, the pixel electrode PE may have a slit structure that includes a stem part that has a cross shape and a plurality of branch parts that radially extend from the stem part.

According to an embodiment, the common electrode CE is disposed over an entire lower portion of the second substrate 112. However, embodiments of the inventive concept are not limited thereto. For example, the common electrode CE may be disposed on the first substrate 111. In this case, at least one of the pixel electrode PE and the common electrode CE has a slit.

According to an embodiment, the storage capacitor Cst includes the pixel electrode PE, a storage electrode branched from a storage line, and an insulation layer disposed between the pixel electrode PE and the storage electrode. The storage line is disposed on the first substrate 111. In addition, the storage line and the gate lines GL1 to GLm are formed on the same layer at the same time. The storage electrode partially overlaps the pixel electrode PE.

According to an embodiment, the pixel PX further includes a one of a red, green or blue color filter CF. FIG. 2 shows the color filter CF as being disposed on the second substrate 112. However, embodiments of the inventive concept are not limited thereto. For example, the color filter CF may be disposed on the first substrate 111.

According to an embodiment, the transistor TR turns on in response to a gate signal received through the gate line GLi. A data voltage received through the data line DLj is transmitted to the pixel electrode PE of the liquid crystal capacitor Clc through the turned-on transistor TR. A common voltage is transmitted to the common electrode CE.

According to an embodiment, electric fields are generated between the pixel electrode PE and the common electrode CE by a voltage difference between the data voltage and the common voltage. Liquid crystal molecules of the liquid crystal layer LC are operated by the electric fields generated between the pixel electrode PE and the common electrode CE. Light transmittance is adjusted by the liquid crystal molecules operated by the electric field to display an image.

According to an embodiment, a uniform storage voltage is transmitted to the storage line. However, embodiments of the inventive concept are not limited thereto. For example, the common voltage may be transmitted to the storage line. The storage capacitor Cst may compensate a charge of liquid crystal capacitor Clc.

Figure 3:
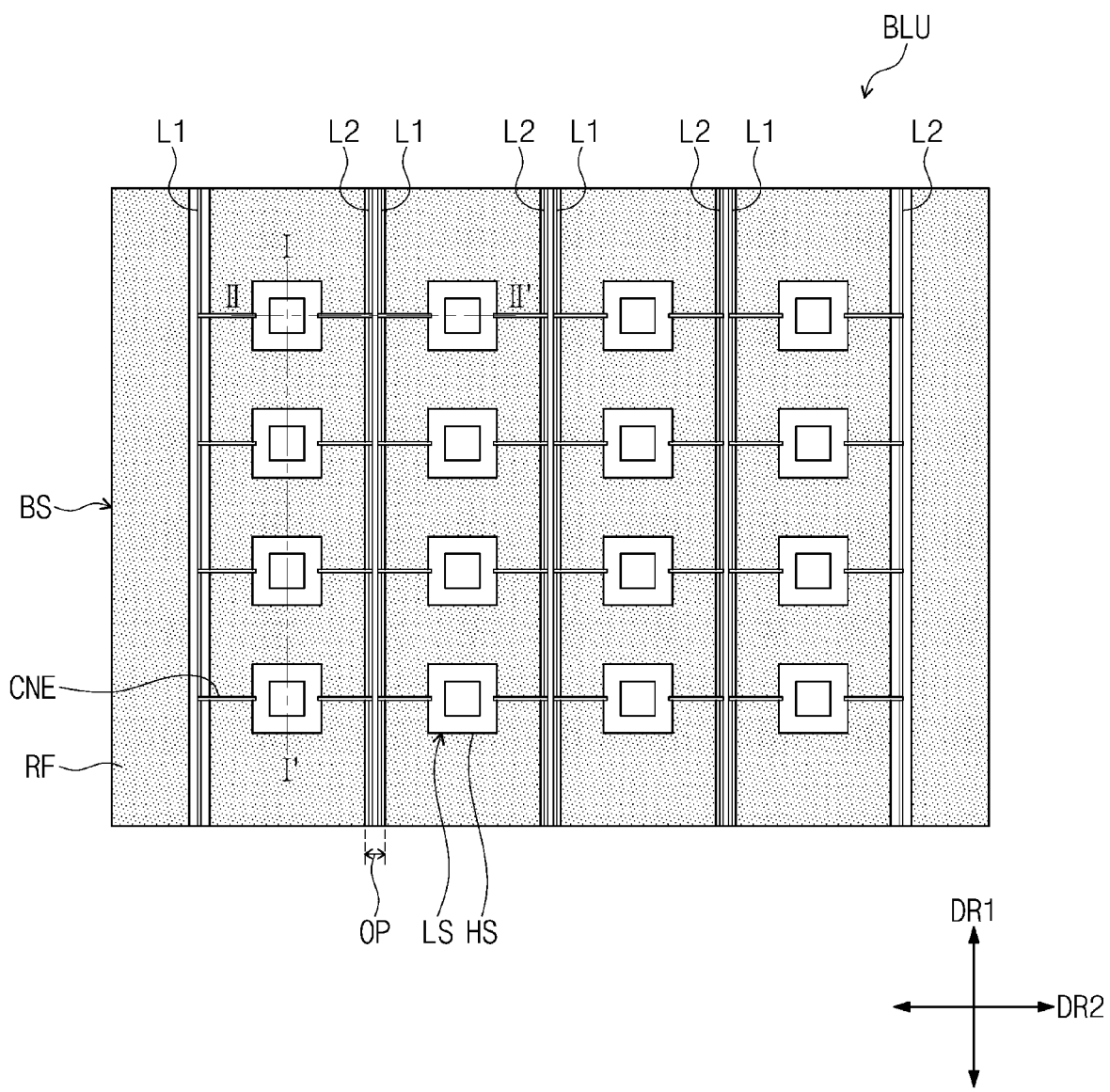
FIG. 3 illustrates lower constituents of a backlight unit of FIG. 1.
Figure 4:
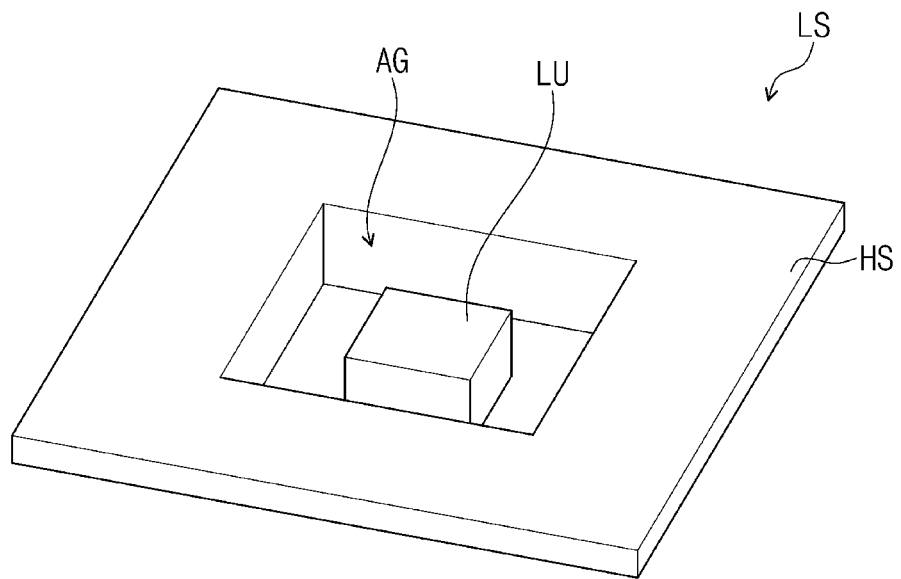
FIG. 4 is a perspective view of a light source of FIG. 3.
Figure 5:
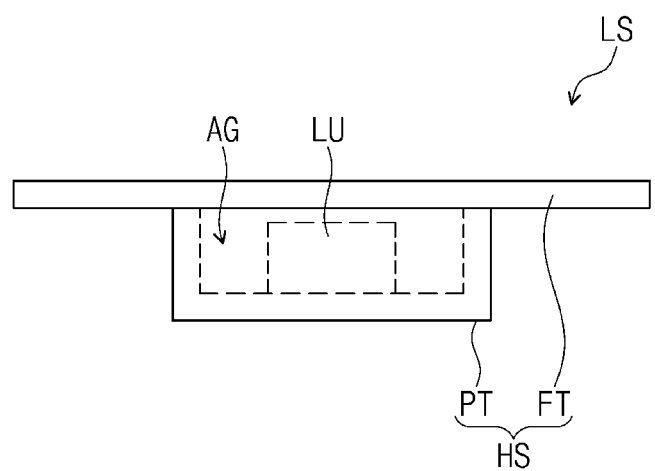
FIG. 5 is a side view of the light source of FIG. 4.

FIG. 3 illustrates lower constituents of a backlight unit of FIG. 1. FIG. 4 is a perspective view of a light source of FIG. 3. FIG. 5 is a side view of the light source of FIG. 4.

Referring to FIG. 3, according to an embodiment, the backlight unit BLU includes a base substrate BS, a plurality of light source LS, and a reflection layer RF. The light sources LS and the reflection layer RF are disposed under the base substrate BS. The structure of the backlight unit BLU will be further described below in detail with reference to FIGS. 6 and 8. The light sources LS are arranged as a matrix. However, embodiments of the inventive concept are not limited thereto. For example, the light sources LS may be arranged in various patterns.

According to an embodiment, a plurality of openings OP are formed in the reflection layer RF. The openings OP extend in the first direction DR1. The light sources LS in an h-th row are disposed between an h-th opening OP and an (h+1)-th opening OP, where h is a natural number. Here, the row is parallel to the first direction DR1.

Referring to FIGS. 4 and 5, according to an embodiment, the light source LS includes a light source unit LU and a housing HS that accommodates the light source unit LU. An accommodation recess AG is formed in the housing HS, and the light source unit LU is disposed in the accommodation recess AG.

According to an embodiment, the housing HS includes a flat part FT that has a frame shape and a protrusion PT that protrudes downward from an inner surface of the flat part FT. The accommodation recess AG is formed by the protrusion PT. The flat part FT has a flat surface that is parallel to the bottom surface of the base substrate BS.

Referring again to FIG. 3, according to an embodiment, the housings HS are arranged in the form of a matrix and are connected to the base substrate BS. The flat part FT of each of the housings HS is disposed on the base substrate BS, and the light source unit LU accommodated in each of the housings HS is disposed in are exposed to the base substrate BS by the accommodation recess AG. The housings HS arranged in an h-th row are disposed between the h-th opening OP and the (h+1)-th opening OP.

According to an embodiment, since FIG. 3 illustrates each of the housings HS as being on a rear surface of the base substrate BS, the light source units LU disposed in the accommodation recesses AG of each of the housings HS are not visible. The housings HS are connected to lines L1 and L2 through a plurality of connection electrodes CNE that extend in the second direction DR2.

According to an embodiment, the lines L1 and L2 include a plurality of first lines L1 and a plurality of second lines L2. One first line L1 is disposed in a leftmost opening OP, and one second line L2 is disposed in a rightmost opening OP. A pair of a first line L1 and a second line L2 are disposed in each of the remaining openings OP. The first line L1 of the pair of first and second lines L1 and L2 is disposed at a right side, and the second line L2 of the pair of first and second lines L1 and L2 is disposed at a left side.

According to an embodiment, the first line L1 in the h-th opening OP and the second line L2 in the (h+1)-th opening OP are connected to the housings HS in the h-th row through a corresponding connection electrode CNE. The second line L2 of the first and second lines L1 and L2 disposed in the (h+1)-th opening OP is closer to the housing HS in the h-th row than the first line L1.

According to an embodiment, each of the light source units LU is a light emitting diode that generates first light. The first light is blue. In addition, the housings HS include lead electrodes connected to the light source units LU. The lead electrodes are connected to the connection electrodes CNE, and the connection electrodes CNE are connected to the first and second lines L1 and L2. That is, the light source units LU are connected to the first and second lines L1 and L2 through the housings HS and the connection electrodes CNE.

According to an embodiment, driving voltages that drive the light source units LU are transmitted to the first and second lines L1 and L2. The driving voltages are transmitted to the light source units LU through the connection electrodes CNE and the housings HS. The light source units LU operate by receiving the driving voltages.

In an embodiment, light sources LS in a same row are connected to the same first line L1 and the same second line L2. Thus, a local dimming operation can be performed. The local dimming divides the display panel 110 into predetermined blocks and controls light sources LS of each block to have a selective or different luminance according to the luminance of an image portion displayed by each of the blocks.

For example, according to an embodiment, the first and second lines L1 and L2 connected to the light sources LS in the h-th row receive the operation voltages, and thus, the light sources LS in the h-th row can operate. The first and second lines L1 and L2 connected to the light sources LS in the (h+1)-th row do not receive the operation voltages, and thus, the light sources LS in the (n+1)-th row do not operate. Alternatively, the luminance of the light sources LS arranged in the h-th row and the luminance of the light sources LS arranged in the (h+1)-th row can differ from each other according to the applied voltages.

Figure 6:
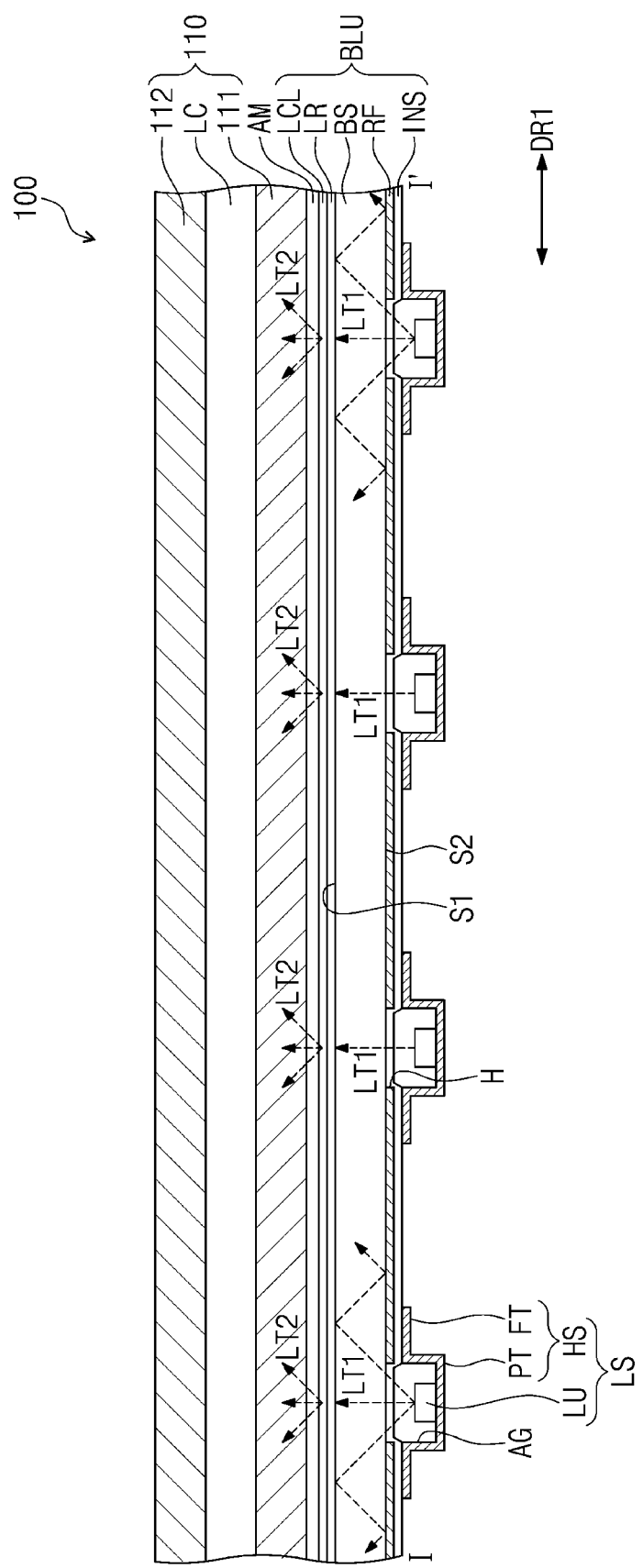
FIG. 6 is a cross-sectional view taken along line I-I' of FIG. 3.
Figure 7:
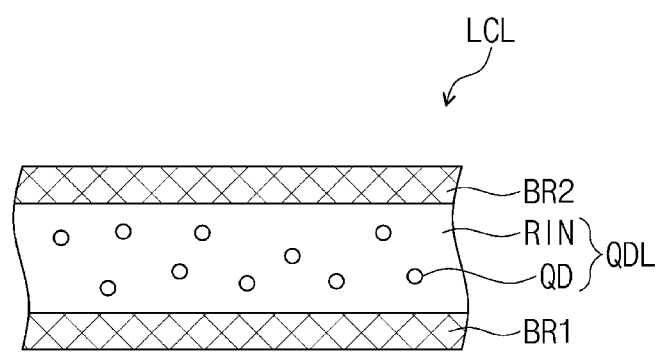
FIG. 7 is a cross-sectional view of a light conversion member of FIG. 5.

FIG. 6 is a cross-sectional view taken along line I-I' of FIG. 3. FIG. 7 is a cross-sectional view of the light conversion member of FIG. 5.

For convenience of description, a cross-section of the display panel 110 together with a cross-section of the backlight unit BLU is illustrated in FIG. 6.

Referring to FIGS. 6 and 7, according to an embodiment, the backlight unit BLU include a base substrate BS, a low-refractive index layer LR, a light conversion layer LCL, a reflection layer RF, and a plurality of light sources LS. The base substrate BS includes a glass substrate. However, embodiments of the inventive concept are not limited thereto. For example, various materials may be used for the base substrate BS in other embodiments.

Hereinafter, according to an embodiment, a top surface of the base substrate BS, which faces the display panel 110, is defined as a first surface S1, and a bottom surface opposite to the top surface of the base substrate BS is defined as a second surface S2.

According to an embodiment, the low-refractive index layer LR may be disposed on the first surface S1. The low-refractive index layer LR is disposed between the first surface S1 of the base substrate BS and the display panel 110. The low-refractive index layer LR has a refractive index less than that of the base substrate BS.

According to an embodiment, the light conversion layer LCL is disposed on the low-refractive index layer LR, and the display panel 110 is disposed on the light conversion layer LCL. The light conversion layer LCL is disposed between the low-refractive index layer LR and the display panel 110.

According to an embodiment, the light conversion layer LCL converts the first light LT1 emitted by the light sources LS into second light LT2. For example, the first light LT1 is blue light, and the second light LT2 is white light.

Referring to FIG. 7, according to an embodiment, the light conversion layer LCL includes a first barrier layer BR1, a second barrier layer BR2 that faces the first barrier layer BR1, and a quantum dot layer QDL disposed between the first barrier layer BR1 and the second barrier layer BR2. Each of the first and second barrier layers BR1 and BR2 includes an inorganic material. The quantum dot layer QDL includes a resin RIN and a plurality of quantum dots QD contained in the resin RIN.

According to an embodiment, the light conversion layer LCL includes quantum dots QD that differ from each other according to a type of light source LS to generate white light. For example, when the light source LS generates blue light, the light conversion layer LCL includes quantum dots QD that absorb blue light to emit green light and quantum dots QD that absorb blue light to emit red light.

According to an embodiment, the quantum dots QD absorb the blue light received from the light sources LS and convert the blue light into the green light or red light. In addition, a portion of the blue light is not absorbed by the quantum dots QD. Thus, blue, green, and red light are mixed with each other in the light conversion layer LCL to generate the white light. The quantum dots QD diffuse the white light. The second light LT2, which is the white light generated in the light conversion layer LCL, is provided to the display panel 110.

According to an embodiment, the light source units LU are accommodated in the accommodation recesses AG of the housing HS and are disposed under the second surface S2. The light source units LU are exposed to the base substrate BS by the accommodation recesses AG of the housings HS. The housings HS are connected to the second surface S2. A configuration of the housings HS connected to the second surface S2 will be described below in detail.

According to an embodiment, the reflection layer RF is disposed under the second surface S2, and the housings HS and the light source units LU are disposed under the reflection layer RF. The reflection layer RF includes a material that reflects light. For example, the reflection layer RF includes a metal such as aluminum or copper.

According to an embodiment, a plurality of holes H are formed in the reflection layer RF. The holes H overlap the accommodation recesses AG. In particular, the accommodation recesses AG are formed in one-to-one correspondence with the holes H and thus respectively overlap the holes H. As illustrated in FIG. 3, the housings HS are arranged as a matrix, and the holes H are also arranged as a matrix, like the housings HS.

According to an embodiment, an insulation layer INS is disposed under the second surface S2 and covers the reflection layer RF. The insulation layer INS is an inorganic insulation layer that includes an inorganic material. The housings HS and the light source units LU are disposed under the insulation layer INS. The flat parts FT of the housing HS contact portions of the insulation layer INS in the vicinity of the holes H.

According to an embodiment, an adhesion member AM is disposed between the backlight unit BLU and the display panel 110. The backlight unit BLU and the display panel 110 adhere to each other by the adhesion member AM. For example, the adhesion member AM is disposed between the light conversion layer LCL and the first substrate 111, and thus, the light conversion layer LCL and the first substrate 111 adhere to each other by the adhesion member AM. The adhesion member AM is an optically clear adhesive.

According to an embodiment, the first light LT1 generated in the light source units LU is provided to the low-refractive index layer LR after propagating through the base substrate BS. Since the lower-refractive layer LR has a refractive index less than that of the base substrate BS, the first light LT1 can be totally reflected by a boundary surface between the base substrate BS and the low-refractive index layer LR. For example, depending to an angle at which the first light LT1 is emitted, the first light LT1 is provided to the low-refractive index layer LR or reflected by the boundary surface between the base substrate BS and the low-refractive index layer LR.

According to an embodiment, the first light LT1 provided to the low-refractive index layer LR is provided to the light conversion layer LCL after propagating through the low-refractive index layer LR. As described above, the first light LT1 provided to the light conversion layer LCL is converted into second light LT2 in the light conversion layer LCL and is then emitted to the display panel 110.

According to an embodiment, the first light LT1 reflected by the boundary surface between the base substrate BS and the low-refractive index layer LR propagates to the second surface S2 of the base substrate BS and is then reflected upward by the reflection layer RF under the second surface S2. Due to these reflections, the first light LT1 propagates inside of the base substrate BS to be provided to the low-refractive index layer LR and then provided to the light conversion layer LCL by propagating through the low-refractive index layer LR. That is, since the first light LT1 is recycled, light efficiency is improved.

Figure 8:
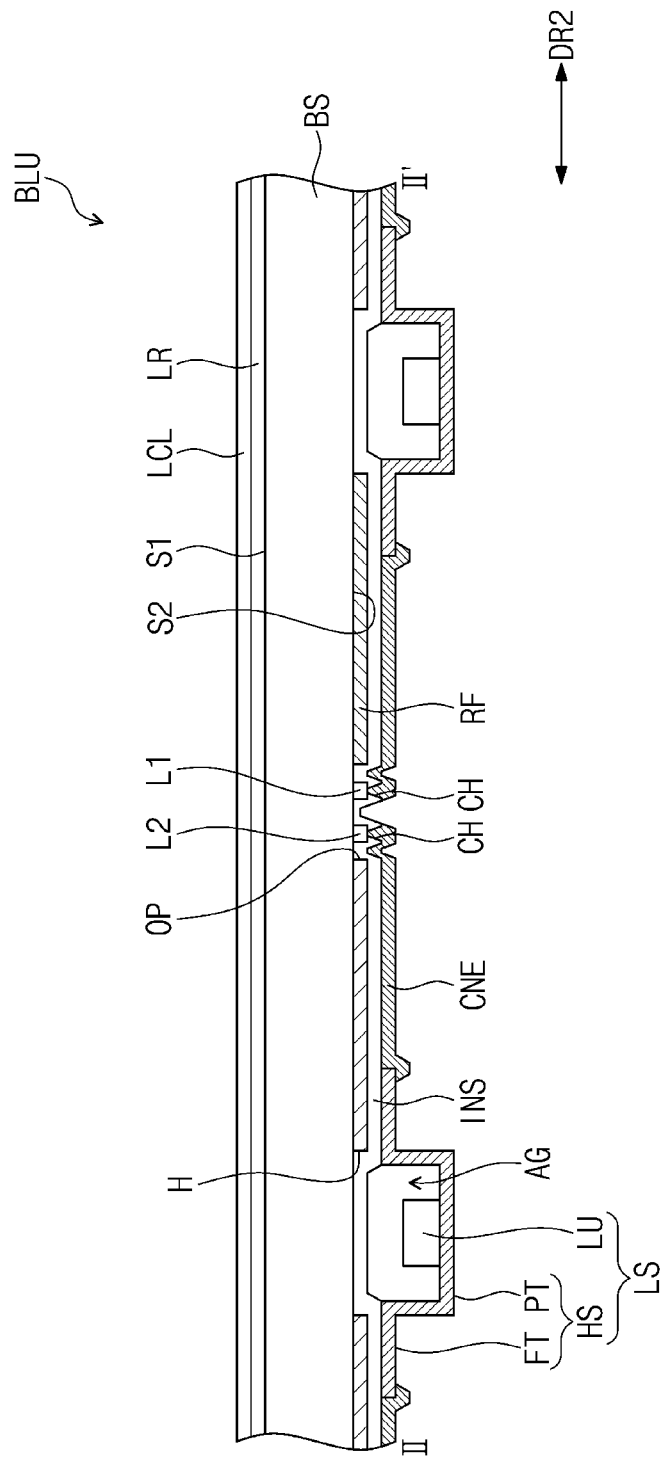
FIG. 8 is a cross-sectional view taken along line II-II' of FIG. 3.

FIG. 8 is a cross-sectional view taken along line II-II' of FIG. 3.

For convenience of description, the cross-section of the backlight unit BLU is enlarged in FIG. 8. However, the display panel 110 and the adhesion member AM are not illustrated.

Referring to FIG. 8, according to an embodiment, the first line L1 and the second line L2 are disposed in the opening OP. The first and second lines L1 and L2 are disposed under the second surface S2. The holes H and the openings OP of the reflection layer RF are formed by removing predetermined portions of the reflection layer RF. Each of the first and second lines L1 and L2 includes the same material as the reflection layer RF.

According to an embodiment, the insulation layer INS is disposed under the second surface S2 and cover the first and second lines L1 and L2 and the reflection layer RF. Thus, the first and second lines L1 and L2 are insulated from the reflection layer RF by the insulation layer INS.

According to an embodiment, a plurality of contact holes CH are formed in the insulation layer through which predetermined portions of the first and second lines L1 and L2 are exposed. The housings IS are connected to the first and second lines L1 and L2 through the contact holes CH.

In particular, according to an embodiment, the connection electrodes CNE are disposed under the insulation layer INS and are connected to the housings HS and the first and second lines L and L2. The connection electrodes CNE are connected to the first and second lines L1 and L2 through the contact holes CH. In addition, the connection electrodes CNE extend in the second direction DR2 and are connected to edges of the flat parts FT of the housings HS.

According to an embodiment, the connection electrodes CNE are extend up to the predetermined portions of the flat parts FT, which are adjacent to the edges of the flat parts FT. Thus, the connection electrodes CNE are disposed under the insulation layer INS and cover edges of the flat parts FT.

According to an embodiment, when the flat parts FT contact portions of the insulation layer INS in the vicinity of the holes H, since the connection electrodes CNE cover the edges of the flat parts FT, the housing HS can be connected to the second surface S2. As described above, the light source units LU are connected to the first and second lines L1 and L2 through the housings HS and the connection electrodes CNE.

In an embodiment of the inventive concept, the light source units LU are connected to the second surface of the base substrate BS by the housing. However, if the housing HS is not used, the light source units LU are not connected to the base substrate BS. In this case, the light source units LU are disposed on the bottom surface of a bottom chassis spaced downward from the base substrate BS. Thus, the backlight unit may become thicker. However, in an embodiment of the inventive concept, since the light source units LU may be connected to the base substrate BS, the backlight unit has a reduced thickness. Therefore, the display device 100 has a reduced thickness.

In addition, in an embodiment of the inventive concept, the light source units LU are not mounted on a light source substrate on which the lines are disposed. The first and second lines L1 and L2 are disposed on the second surface S2 of the base substrate BS so that the light source units LU can be locally dimmed by the first and second lines L1 and L2.

FIGS. 9 to 19 illustrate a method for manufacturing a display device according to an embodiment of the inventive concept.

Figure 11:
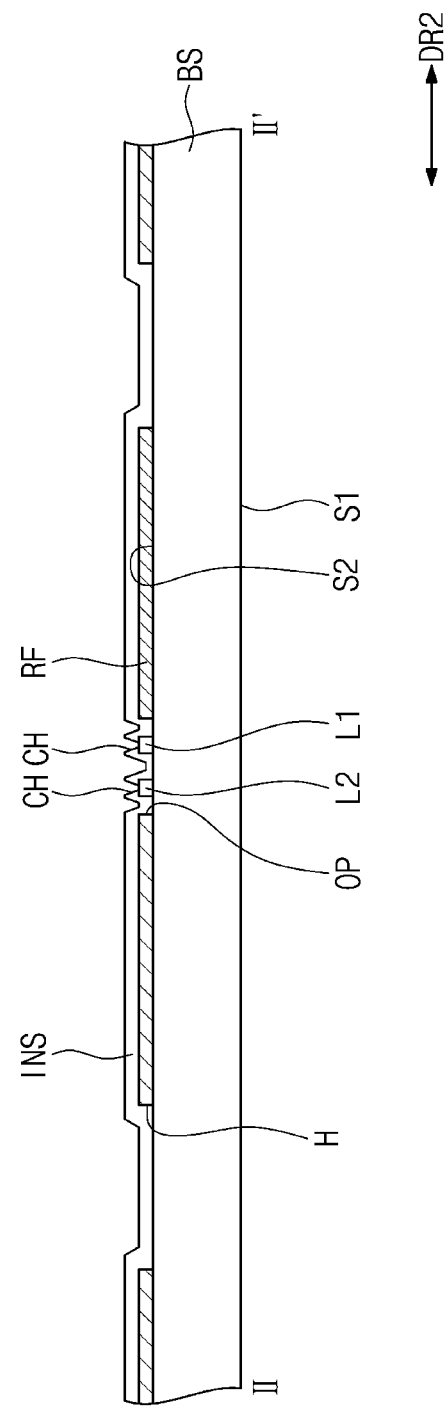
Figure 15:
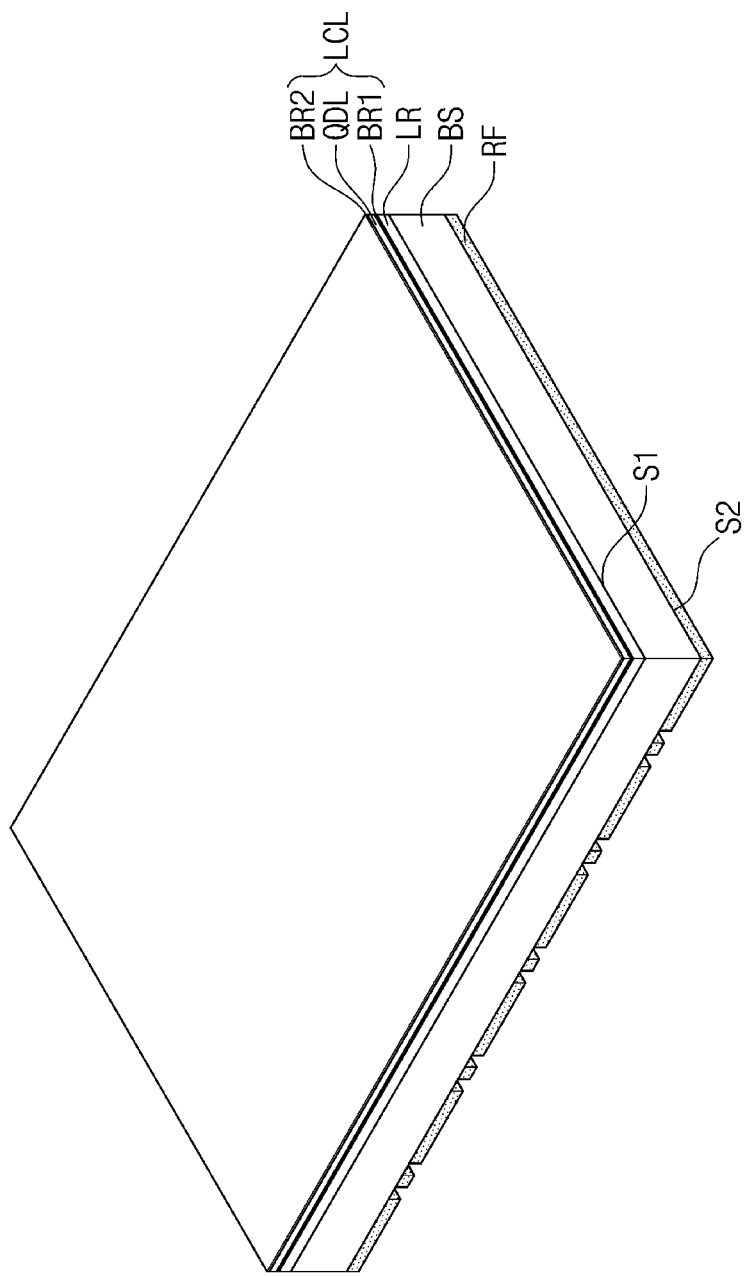
Figure 16:
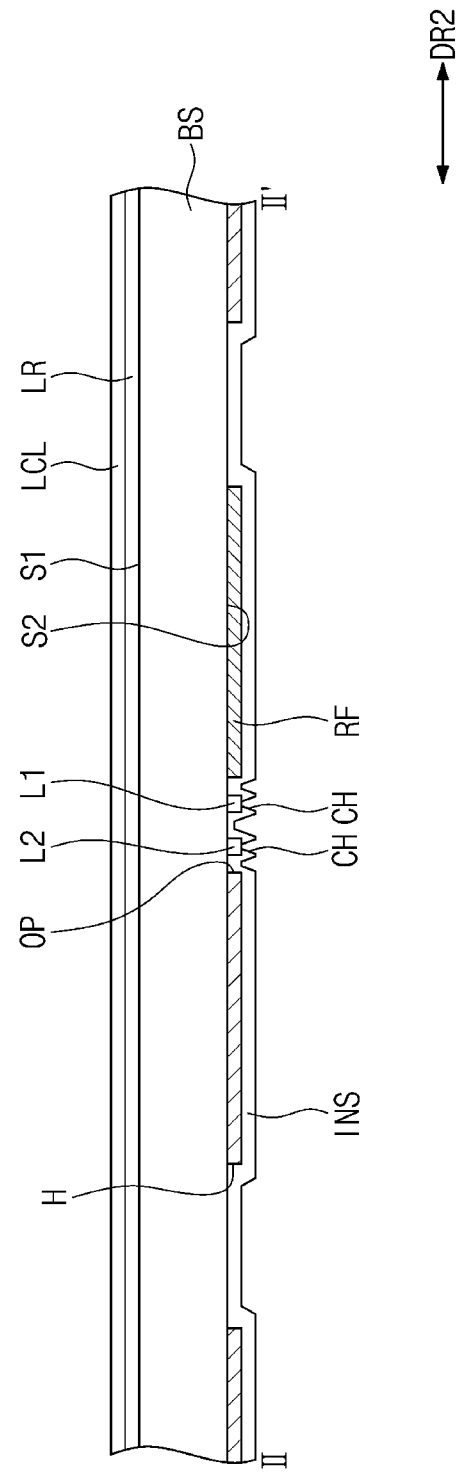
Figure 19:
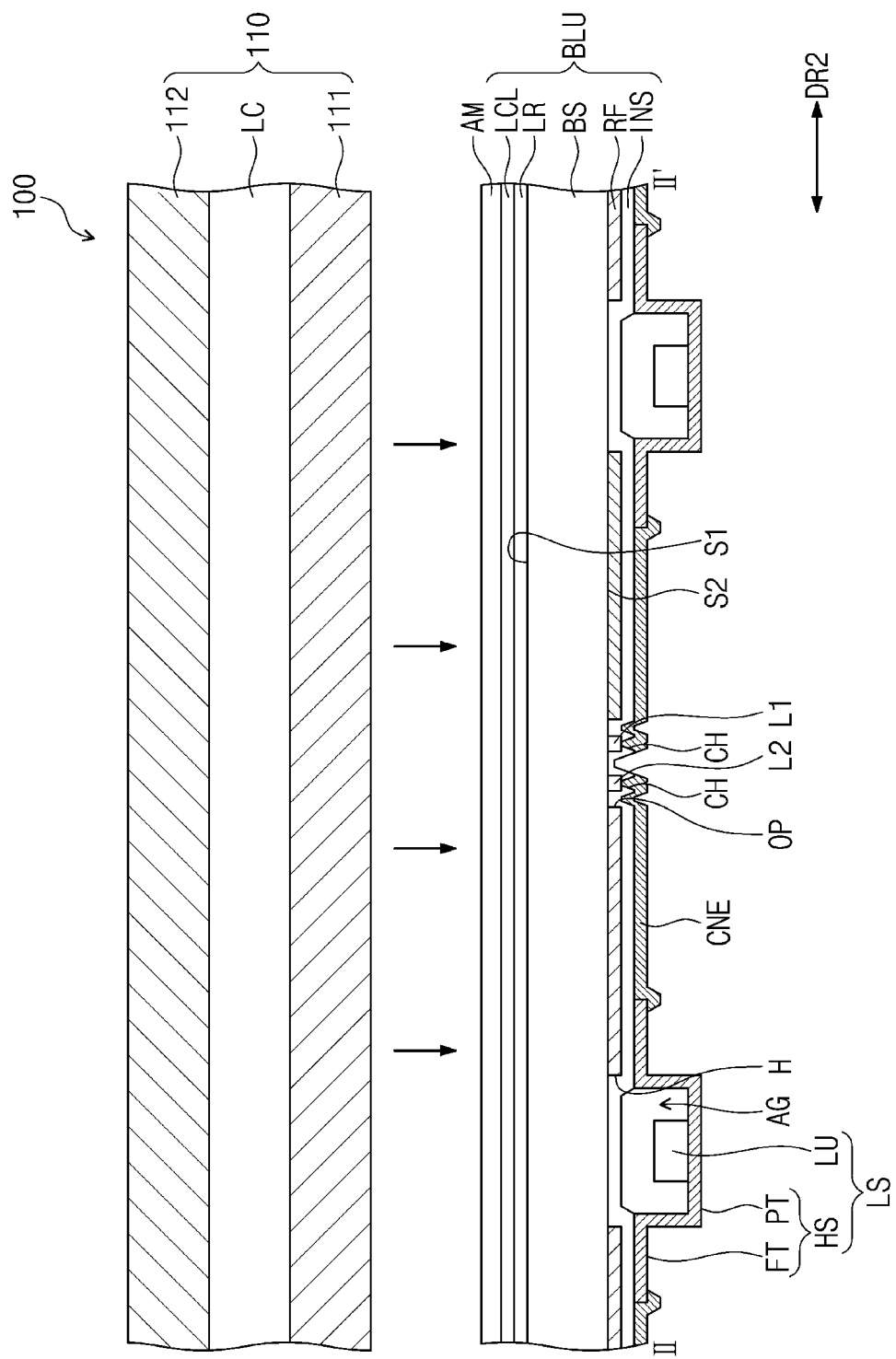

For convenience of description, FIGS. 11, 16, and 19 illustrate cross-sectional views corresponding to the cross-section of FIG. 8. In addition, FIGS. 12 to 15 illustrate perspective views of constituents formed on a first substrate S1 of a base substrate BS.

Figure 9:
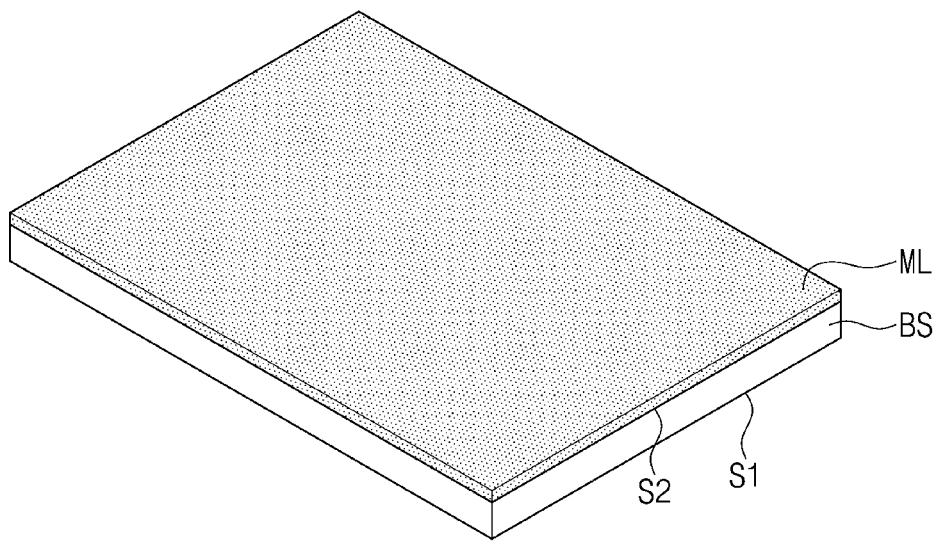
FIGS. 9 to 19 illustrate a method for manufacturing a display device according to an embodiment of the inventive concept.

Referring to FIG. 9, according to an embodiment, a metal layer ML is disposed on a second surface S2 of the base substrate BS. The metal layer ML is disposed on the second surface S2 to form a reflection layer RF and first and second lines L1 and L2.

Figure 10:
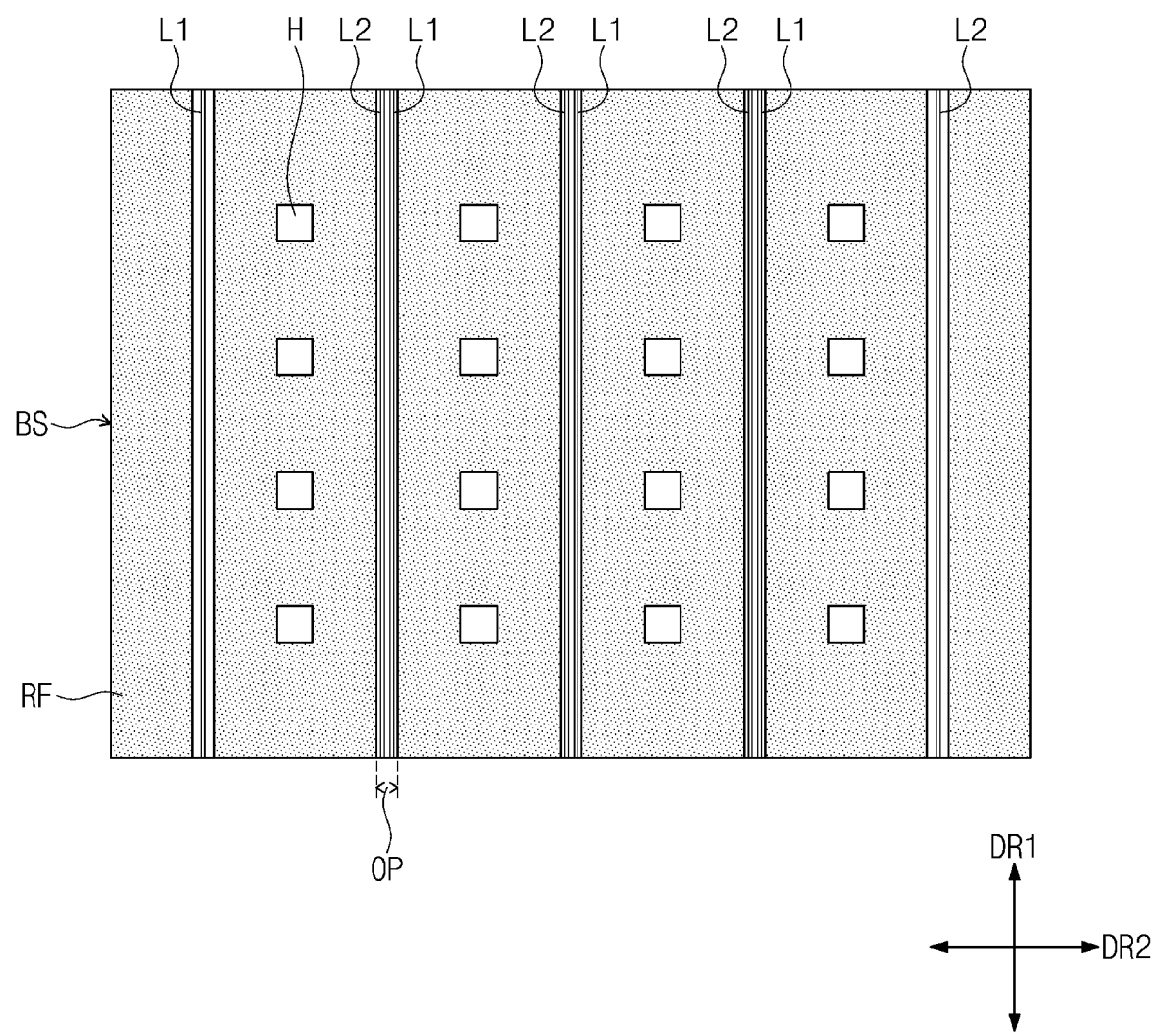

Referring to FIG. 10, according to an embodiment, the metal layer ML is patterned to form the reflection layer RF in which a plurality of holes H and a plurality of openings OP are formed. Also, the first and second lines L1 and L2 are formed in the openings OP. The holes H arranged in an h-th row may be disposed between an h-th opening OP and an (h+1)-th opening OP.

According to an embodiment, the reflection layer RF and the first and second lines L1 and L2 are formed at substantially the same time by patterning the metal layer ML. Thus, the reflection layer RF and the first and second lines L1 and L2 include the same metal.

Referring to FIG. 11, according to an embodiment, an insulation layer INS is disposed on the second surface S2 that cover the reflection layer RF and the first and second lines L1 and L2. A plurality of contact holes CH through which predetermined portions of the first and second lines L1 and L2 are exposed are formed in the insulation layer INS. The contact holes CH are formed by removing predetermined portions of the insulation layer INS.

Hereinafter, the insulation layer INS disposed under the second surface S2 is omitted in FIGS. 12 and 15 for convenience of description.

Figure 12:
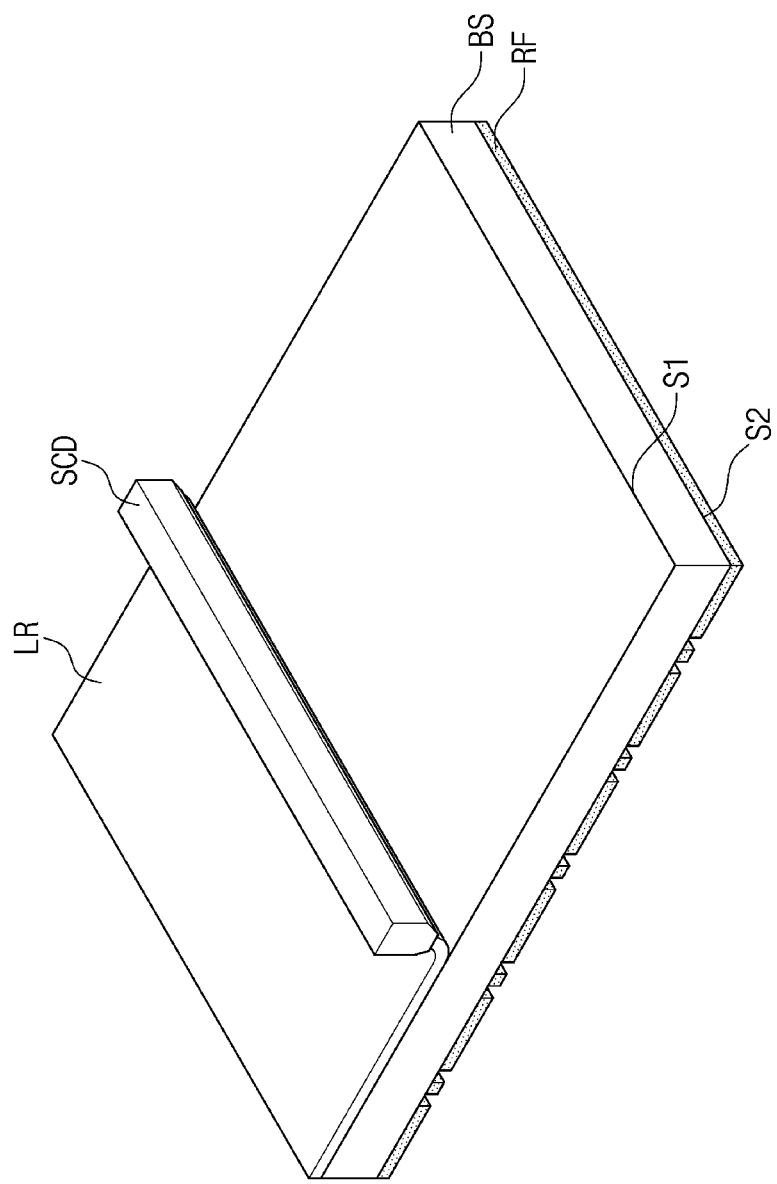

Referring to FIG. 12, according to an embodiment, the base substrate BS is overturned, and a low-refractive index layer LR is formed on the first surface S1 of the base substrate BS. The low-refractive index layer LR is made of an organic material and has a refractive index less than that of the base substrate BS.

According to an embodiment, a slit coating method is used to form the low-refractive index layer LR. For example, as illustrated in FIG. 12, a material for forming the low-refractive index layer LR is provided on the first surface S1 through a slit coating device SCD. However, embodiments of the inventive concept are not limited thereto. For example, in other embodiments, various coating methods, such as a spin coating method, an inject printing method, or a roller coating method, in addition to the slit coating method, may be used to apply the low-refractive index layer LR to the first surface S1.

Figure 13:
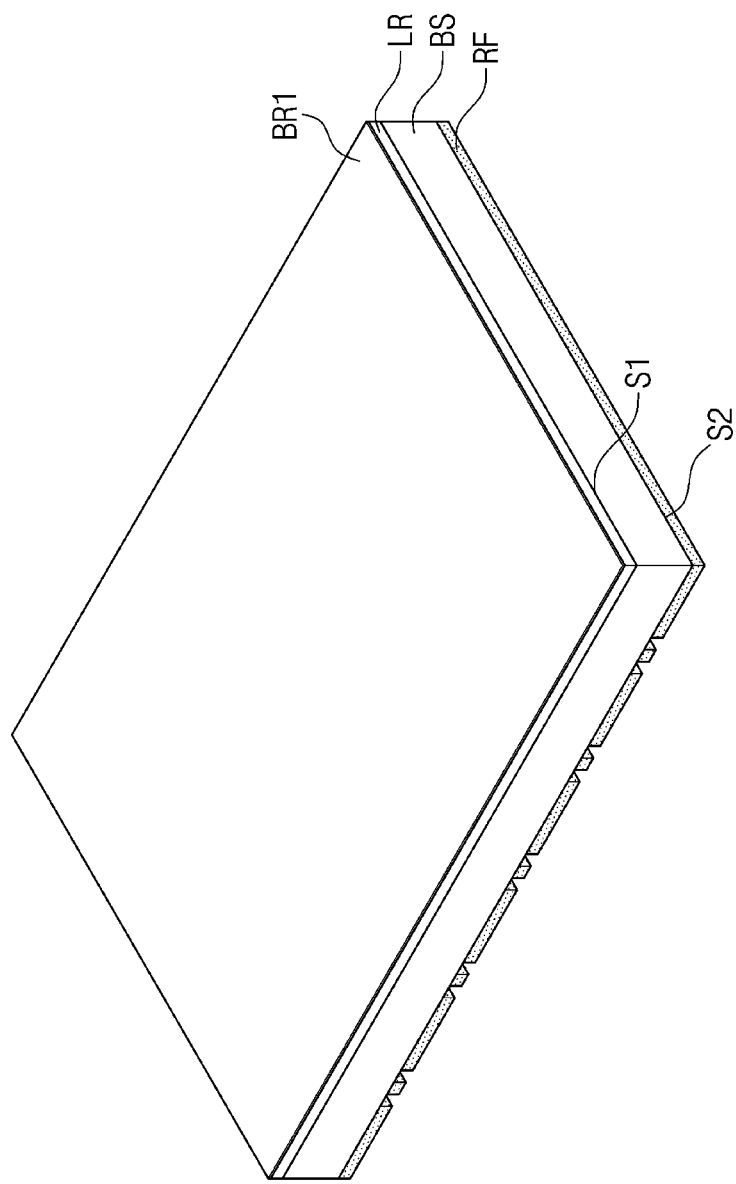

Referring to FIG. 13, according to an embodiment, a first barrier layer BR1 of a light conversion layer LCL is disposed on the low-refractive index layer LR. For example, a chemical vapor deposition method can be used to form the first barrier layer BR1. The first barrier layer BR1 includes an inorganic material.

Figure 14:
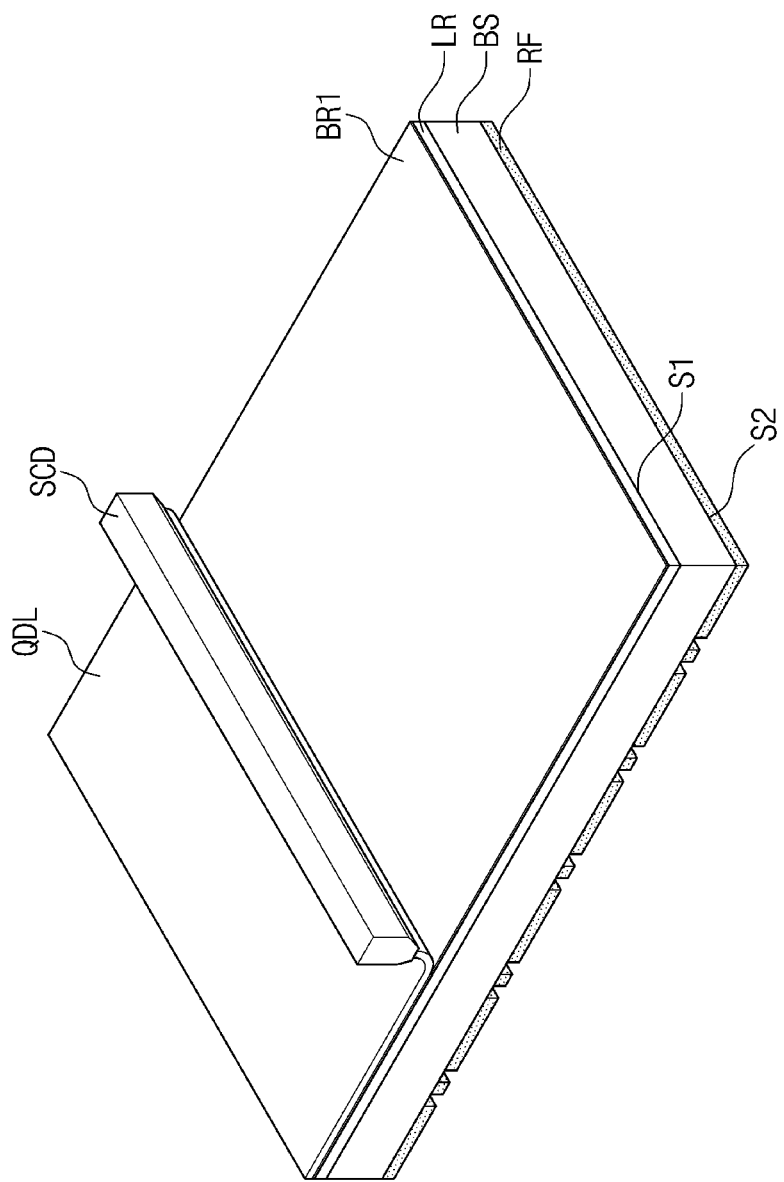

Referring to FIG. 14, according to an embodiment, a quantum dot layer QDL is disposed on the first barrier layer BR1. For example, to form the quantum dot layer QDL, the resin RIN that contains the quantum dots QD is disposed on the first barrier layer BR2 through the slit coating method. However, embodiments of the inventive concept are not limited thereto. For example, in other embodiments, various coating methods, such as a spin coating method, an inject printing method, or a roller coating method in addition to the slit coating method, may be used to form the quantum dot layer QDL.

Referring to FIG. 15, according to an embodiment, a second barrier layer BR2 is disposed on the quantum dot layer QDL. For example, a chemical vapor deposition method may be used to form the second barrier layer BR2. The second barrier layer includes an inorganic material.

Referring to FIG. 16, according to an embodiment, the low-refractive index layer LR is disposed on the first surface S of the base substrate BS through the processes described with reference to FIGS. 12 and 15, and the light conversion layer LCL is disposed on the low-refractive index layer LR. For convenience of description, the light conversion layer will be illustrated as a single layer in drawings that follow FIG. 16.

Figure 17:
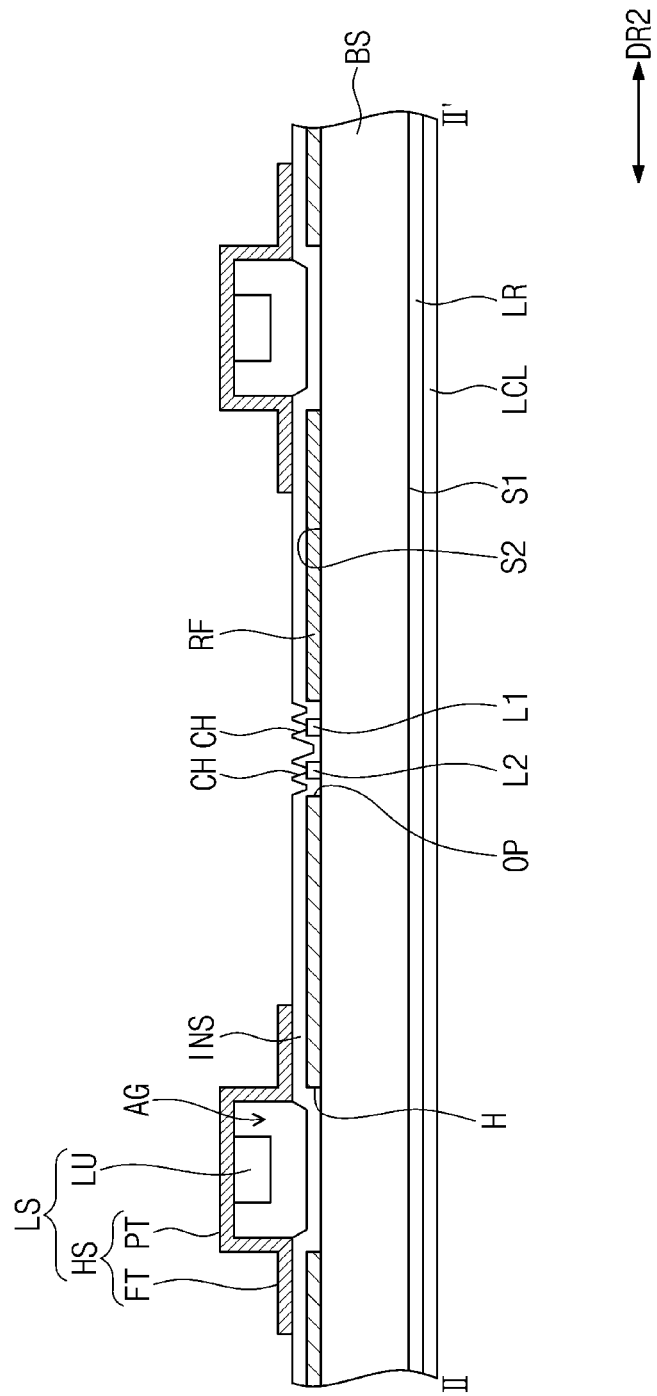

Referring to FIG. 17, according to an embodiment, the base substrate BS is overturned, and light sources LS are disposed on the second surface S2 of the base substrate BS. Light source units LU and housings HS are disposed on the insulation layer INS, and accommodation recesses AG defined by the housings HS overlap holes H. In addition, the flat part FT contacts portions of the insulation layer INS in the vicinity of the holes H.

Figure 18:
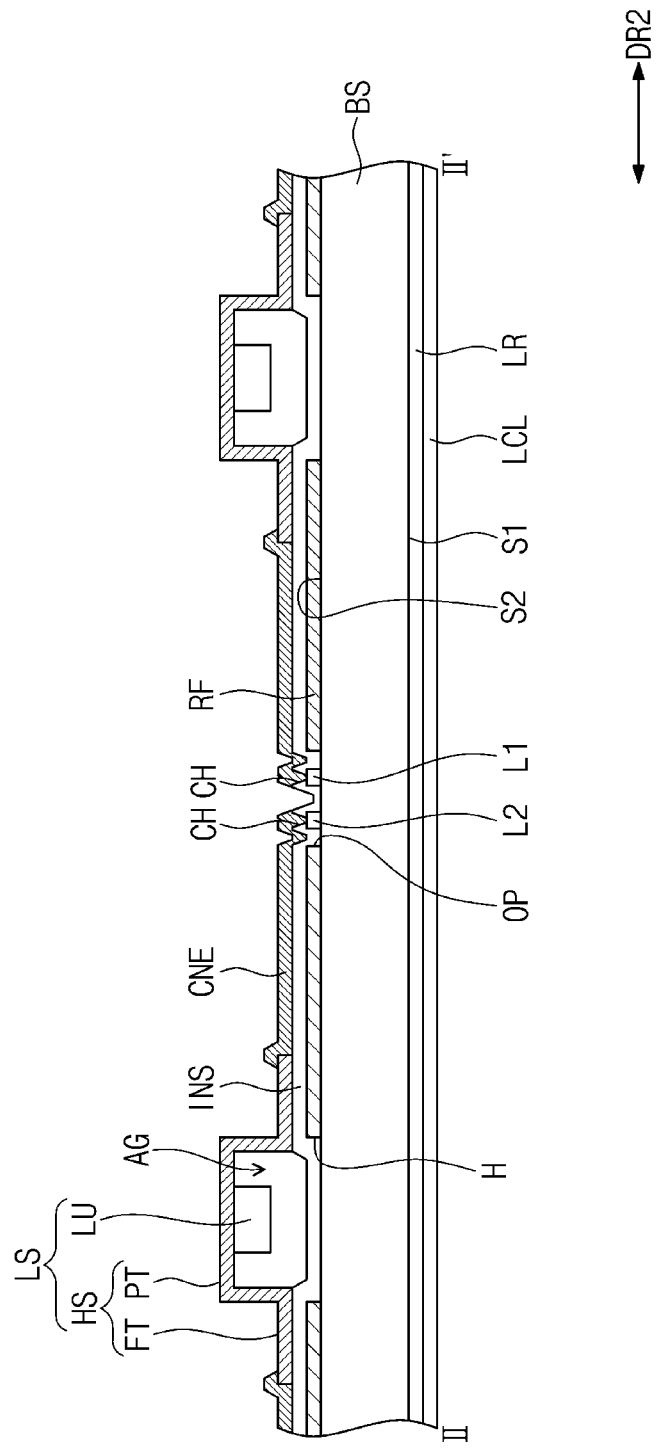

Referring to FIG. 18, according to an embodiment, a plurality of connection electrodes CNE are disposed on the insulation layer INS, and the connection electrodes CNE are connected to the flat parts FT of the housings HS and the first and second lines L1 and L2. The connection electrodes CNE are connected to the first and second lines L1 and L2 through contact holes CH.

According to an embodiment, after the insulation layer INS is disposed on the second surface S2, the low-refractive index layer LR and the light conversion layer LCL are disposed on the first surface S1. However, embodiments of the inventive concept are not limited to this process sequence. For example, after the low-refractive index layer LR and the light conversion layer LCL are disposed on the first surface S1, the insulation layer INS may be disposed on the second surface S2, and the light sources LS may be connected to the second surface S2.

According to an embodiment, a reason why light sources LS are connected to the second surface S2 after the low-refractive index layer LR and the light conversion layer LCL are disposed on the first surface S1 is as follows. If the light sources LS are first connected to the second surface S2 before the low-refractive index layer LR and the light conversion layer LCL are disposed on the first surface S1, the base substrate BS is oriented so that the second surface S2 is a lower side, and the first surface S1 is an upper side so as to dispose the low-refractive index layer LR and the light conversion layer LCL on the first surface S1.

According to an embodiment, when the process of disposing the first low-refractive index layer LR and the light conversion layer LCL on the first surface S1 is performed, a stage supporting the base substrate BS is disposed under the base substrate BS. The base substrate BS is fixed to the stage.

However, according to an embodiment, since the light sources LS are disposed on the second surface S2, the light sources LS may contact the stage. Thus, the base substrate BS may not be easily fixed. In addition, the light sources LS that are pulled toward the stage to contact the stage can be damaged on the stage. Thus, when the backlight unit BLU is manufactured, the light sources LS are connected to the second surface S2 of the base substrate BS by the last process.

Referring to FIG. 19, according to an embodiment, the base substrate BS is overturned again, an adhesion member AM is disposed on the light conversion layer LCL, and the display panel 110 is disposed on the adhesion member AM.

The display panel 110 is attached to the light conversion layer LCL by the adhesion member AM to manufacture the display device 100.

According to an embodiment of the inventive concept, the light source units are connected to the bottom surface of the base substrate opposite to the top surface on which the quantum dot sheet is disposed.

It will be apparent to those skilled in the art that various modifications and variations can be made to embodiments of the inventive concept. Thus, it is intended that exemplary embodiments of the present disclosure cover the modifications and variations of embodiments of the disclosure provided they come within the scope of the appended claims and their equivalents. Thus, to the maximum extent allowed by law, the scope of embodiments of the present disclosure is to be determined by the broadest permissible interpretation of the following claims and their equivalents, and shall not be restricted or limited by the foregoing detailed description.

What is claimed is:

1. A display device comprising:
   a base substrate;
   a display panel disposed on a first surface of the base substrate;
   a low-refractive index layer disposed between the first surface and the display panel;
   a plurality of light source units disposed under a second surface opposite to the first surface of the base substrate;
   a plurality of housings that define accommodation recesses that respectively accommodate the light source units therein;
   a reflection layer disposed under the second surface and in which are formed a plurality of holes that overlap the accommodation recesses and a plurality of openings that extend in a first direction;
   a plurality of lines disposed in the openings tender the second surface and connected to the housings; and
   an insulation layer disposed under the second surface that covers the reflection layer and the lines,
   wherein the light source units are exposed to the base substrate through the accommodation recesses, and the housings are connected to the second surface, and
   wherein the housings are disposed under the insulation layer and connected to the lines through a plurality of contact holes formed in the insulation layer.

2. The display device of claim 1,
   wherein the housings are disposed under the reflection layer, and the housings arranged in an h-th row are disposed between an h-th opening and an (h+1)-th opening, where h is a natural number.

3. The display device of claim 1, further comprising
   a plurality of connection electrodes disposed under the insulation layer and that extend in a second direction that crosses the first direction and are connected to the housings and the lines,
   wherein the connection electrodes are connected to the lines through the contact holes.

4. The display device of claim 3, wherein the light source units are connected to the lines through the housings and the connection electrodes.

5. The display device of claim 3, wherein each of the housings comprises:
   a flat pan parallel to the second surface and that has a frame shape; and
   a protrusion that protrudes downward from an inner surface of the flat part, wherein the accommodation recesses are defined in the protrusions of the housings, and the flat parts of the housings contact portions of the insulation layer in a vicinity of the holes.

6. The display device of claim 5, wherein the connection electrodes cover edges of the flat parts of the housings and are connected to the edges of the flat parts.

7. The display device of claim 2, wherein the lines comprise
a plurality of first lines and a plurality of second lines, and one first line is disposed in a leftmost opening,
one second line is disposed in a rightmost opening, and
pairs of first and second lines are respectively disposed in the remaining openings,
wherein the first hue disposed in the h-th opening and the second line disposed in the (h+1)-th opening are connected to the housings arranged in an h-th row.

8. The display device of claim 1, wherein
the base substrate comprises a glass substrate, and
the low-refractive index layer has a refractive index less than that of the base substrate.

9. The display device of claim 1, further comprising
a light conversion layer disposed between the low-refractive index layer and the display panel,
wherein the light source units generate first light, and the light conversion layer converts the first light into second light.

10. The display device of claim 9, further comprising an adhesion member disposed between the light conversion layer and the display panel to attach the display panel to the light conversion layer.

11. A method for manufacturing a display device, the method comprising:
disposing a metal layer on a second surface of abase substrate opposite to a first surface of the base substrate;
patterning the metal layer wherein a reflection layer is formed that includes a plurality of holes and a plurality of opening extending in a first direction and wherein first and second lines are formed in the openings;
disposing an insulation layer on the second surface that covers the reflection layer and the first and second lines;
disposing a low-refractive index layer on the first surface;
disposing a light conversion layer on the low-refractive index layer;
disposing a plurality of housings that accommodate a plurality of light source units on the insulation layer;
connecting the housings to the lines through contact holes formed in the insulation layer; and
disposing a display panel on the light conversion layer,
wherein the housings arranged in an h-th row are disposed between an h-th opening and an (h+1)-th opening, wherein h is a natural number.

12. The method of claim 11, wherein
the light source units are accommodated in a plurality of accommodation recesses defined by the housings and exposed toward the base substrate through the accommodation recesses, and
the accommodation recesses overlap the holes.

13. The method of claim 12, further comprising
disposing a plurality of connection electrodes on the insulation layer that are connected to the housings and the lines, wherein the connection electrodes are connected to the lines through the contact holes.

14. The method of claim 13, wherein each of the housings comprises:
a flat part parallel to the second surface and that has a frame shape; and
a protrusion that protrudes downward from an inner surface of the flat part,
wherein the accommodation recesses are defined in the protrusions of the housings, and
the flat parts of the housings contact portions of the insulation layer in a vicinity of the holes.

15. The method of claim 14, wherein the connection electrodes are cover edges of the flat parts and are connected to the edges of the flat parts.

16. The method of claim 12, wherein
the base substrate comprises a glass substrate, and
the low-refractive index layer has a refractive index less than that of the base substrate.

17. A display device comprising:
a base substrate;
a display panel disposed on a first surface of the base substrate;
a light conversion layer disposed between the first surface and the display panel;
a plurality of light source units disposed under a second surface opposite to the first surface of the base substrate;
a plurality of housings that define accommodation recesses and which respectively accommodate the light source units in the accommodation recesses;
a reflection layer disposed under the second surface and in which are formed a plurality of holes that overlap the accommodation recesses and a plurality of openings that extend in a first direction;
a plurality of lines disposed in the openings under the second surface and connected to the housings; and
an insulation layer disposed under the second surface that covers the reflection layer and the lines,
wherein the light source units are exposed to the base substrate through the accommodation recesses, and the housings are connected to the second surface, and
wherein the housings are disposed under the insulation layer and connected to the lines through a plurality of contact holes formed in the insulation layer.

18. The display device of claim 17, further comprising
a low-refractive index layer disposed between the light conversion layer and the display panel;
wherein the base substrate comprises a glass substrate,
the low-refractive index layer has a refractive index less than that of the base substrate,
the light source units generate first light, and
the light conversion layer converts the first light into second light.

19. The display device of claim 17,
wherein the housings are disposed under the reflection layer, the housings arranged in an h-th row are disposed between an h-th opening and an (h+1)-th opening, where h is a natural number, and
wherein each of the housings comprises:
a flat part parallel to the second surface and that has a frame shape; and
a protrusion that protrudes downward from an inner surface of the flat part, wherein the accommodation recesses are defined in the protrusions of the housings.

* * * * *